(12) United States Patent
Sakharov (10) Patent No.: US 7,995,923 B2
(45) Date of Patent: Aug. 9, 2011

(54) CONTROLLABLE OPTICAL MULTIPLEXER (75) Inventor: Vyacheslav Konstantinovich Sakharov, Moscow (RU)

(73) Assignees: "Federal Agency for Legal Protection of the Results of Intellectual Activity with Military, Special and Dual Purposes" at the Ministry of Justice of Russian Federation, Moscow (RU); Vospi Center CISC (Closed Stock Company), Moscow (RU)

( * ) Notice: Subject to any disclaimer, the term of this patent is extended or adjusted under 35 U.S.C. 154(b) by 693 days.

(21) Appl. No.: 12/085,607

(22) PCT Filed: Nov. 29, 2005

(86) PCT No.: PCT/RU2005/000611
§ 371 (c)(1),
(2), (4) Date: May 28, 2008

(87) PCT Pub. No.: WO2007/064242
PCT Pub. Date: Jun. 7, 2007

(65) Prior Publication Data
US 2009/0245794 A1  Oct. 1, 2009

(51) Int. Cl.
*H04J 14/00* (2006.01)
*H04J 14/04* (2006.01)
*H04J 14/02* (2006.01)

(52) U.S. Cl. ............ 398/82; 385/24; 385/27; 385/50; 398/43; 398/48; 398/83; 398/84; 398/85

(58) Field of Classification Search ............ 398/43, 398/79, 82
See application file for complete search history.

(56) References Cited

U.S. PATENT DOCUMENTS

| | | | | |
|---|---|---|---|---|
| 6,754,411 B2 * | 6/2004 | Ahmadvand et al. | ............ | 385/24 |
| 6,782,158 B2 * | 8/2004 | Zhao | ............ | 385/24 |
| 6,795,654 B2 * | 9/2004 | Cormack | ............ | 398/85 |
| 6,804,430 B2 * | 10/2004 | Ooyama et al. | ............ | 385/24 |
| 7,085,446 B2 * | 8/2006 | Hatayama | ............ | 385/24 |

* cited by examiner

*Primary Examiner* — Ken N Vanderpuye
*Assistant Examiner* — Jermaine Wilson
(74) *Attorney, Agent, or Firm* — James Creighton Wray (57) ABSTRACT

An inventive controllable optical multiplexer for control of multiplexing channels in a fiber-optic communication system provided with $2^N$ of wavelength-division multiplexing channels, whose optical frequencies are re-tunable at a constant wavelength shifting between adjacent channels, comprises a multi-stage structure of optical filters provided with elements for controllable re-tuning transmission coefficients. The optical filters are embodied in the form of single stage, and multi-stage asymmetric Mach-Zehnder interferometers. The electro-optical and thermo-optical phase shift devices are used for controllable re-tuning the transmission coefficients of the optical filters. The demultiplexer can be produced according to integrated optic technologies in the form of a monolithic solid-state device.

9 Claims, 4 Drawing Sheets

CONTROLLABLE OPTICAL MULTIPLEXER

CROSS-REFERENCE TO RELATED APPLICATIONS

This application is a U.S. national phase application of a PCT application PCT/RU2005/000611 filed on 29 Nov. 2005, published as WO2007/064242, whose disclosure is incorporated herein in its entirety by reference.

FIELD OF THE INVENTION

This invention is related to fiber-optic connection systems (hereinafter referred to as FOCS) with wavelength-division multiplexing, particularly to controllable optical multiplexer devices and may be applied in dense wavelength division multiplexing (hereinafter—DWDM) and conservative wavelength division multiplexing (hereinafter—CWDM) systems.

BACKGROUND OF THE INVENTION

Wavelength division multiplexing technologies, applying state-of-the-art approaches allow satisfying applicable requirements to the carrying capacity of FOCS. Nevertheless, the meeting of new and ever increasing requirements of communication system developers requires further improvement and development of the applied technologies. One of the directions of wavelength division multiplexing development is related to applying an approach in which carrying channel frequencies become dynamically readjusted.

The devices which are well-known and exist in a wide spectral range are laser diodes, as well as controllable optic input/output multiplexers. The optical multiplexers with tunable optic carrier channels are needed (hereinafter—controllable optic multiplexers) for connection systems with spectral compression (herein also called wavelength-division) multiplexing.

The controllable optical multiplexers may be used in their basic application as devices for the channels integration and for input to an optic line. They may be part of more complicated devices and wavelength-division multiplexing systems with dynamic functions, e.g. of multi-channel controllable input/output multiplexers.

The controllable optic multiplexers may be applied in multi-channel sensor systems, in optic analogue systems of various designations, for optic filtration and other purposes.

At present, many types of these optic multiplexers have been designed and applied. These are multiplexers in the form of multi-stage structures based on the interference filters or diffraction lattices, multiplexers designed as planar devices based on the so-called phased bundles (AWG) and finally, those closest to the present invention, multi-stage tree structures based upon asymmetric Mach-Zehnder interferometers (MZIs).

It has been known that the MZIs are characterized by small optic losses and have low polarization dependence. The MZI structure with 8÷9 stages is characterized by high selectivity and is capable to overlap the full spectral band utilized in dense wavelength division multiplexing systems.

The known traditional design of a multiplexer based on MZIs, intended for use in a fiber-optical communication system with wavelength-division multiplexing $2^N$ channels and a frequency interval between adjacent channels $\Delta v$, is an N-stage structure of a 'tree' type containing $2^{N-n}$ MZIs in each n-step. The multiplexer has $2^N$ inputs, wherein one channel is passed on each input, and it has one output for a multiplexed optical signal.

Upon receipt of the channels subject to multiplexing on each input of such device, the MZIs of the first stage combine the channels into $2^{N-1}$ groups. Each group is further directed to the second stage, in which the channels are combined again, in this case into $2^{N-2}$ groups. Such process of multiplexing of the groups (and channels) proceeds with sequential passing radiation at all stages of the multiplexer. Finally, at the last stage, all channels are completely combined into one stream (an optical signal).

The optical multiplexers based on the MZIs, as well the other multiplexers above-listed, in overwhelming majority, are static, i.e. have fixed spectral characteristics, and thus they cannot be used in the FOCS with wavelength-division multiplexing, in which frequencies of the channels are dynamically adjusted.

It has been known also that, the single-stage MZIs, supplied with phase shift elements, can be key elements in the controllable optical input/output multiplexer (U.S. Pat. No. 6,795,654). It is evident that in case of proper usage, they could become also a basis for creation of controllable optical multiplexers.

The state-of-the-art optical technology provides a sufficiently wide range of MZIs, which can be used in multiplexers, including those with dynamic functions. The simplest base structure of the MZIs is an asymmetric single cascade or single-stage MZI (hereinafter—single-stage MZI).

The disadvantage of the single-stage MZIs is a non-ideal shape of spectral characteristics, which can cause cross-wise interferences ("crosstalk disturbance") and improper isolation of the channels when used in DWDM systems. The two-stage (two-cascade) asymmetric MZIs and multi-stage (multi-cascade) asymmetric MZIs (hereinafter—two-stage and multi-stage MZIs) have superior spectral characteristics. Furthermore, the multi-stage MZIs are characterized by significantly lower induced dispersion.

It is evident that the controllable optic multiplexer which could be designed in the form of a multi-stage structure including sufficiently great number of MZIs, should be as much as possible protected against environmental influence: temperature instability, vibrations, etc. Therefore, to ensure necessary stability and reliability, the device should have large-scale integration of the used MZIs and should be compact; so the integrated-optical structure is best suited to produce such device.

BRIEF DESCRIPTION OF THE INVENTION

The present invention is intended to create the controllable optical multiplexer for wavelength-division multiplexing systems with dynamic functions. The multiplexer should meet existing requirements for isolation of channels and induced dispersion, and should be suitable for embodiment as an integrated-optical device.

The aim of the present invention is the creating of a method and a device for wavelength-division multiplexing of a plurality of channels to form a multi-channel optical signal by controlling the wavelength characteristics of the multiplexer filtering stages.

The indicated aim has been achieved by providing a method of controllable multiplexing of channels in a fiber optic communication system with wavelength-division (spectral compression) multiplexing of $2^N$ channels, whose optical frequencies are capable to be tuned (adjusted) within a constant spectral interval Δv between neighboring channels, and the aforesaid method comprises the following steps:

(a) inputting $2^N$ channels separately at $2^N$ individual inputs of an N-stage structure of a tree-type, the said N-stage structure comprising in each n stage $2^{N-n}$ optical filters, wherein n=1, 2, ..., N, each said filter contains two inputs and at least one output, the filters are capable of controllable tuning transmission coefficients, and the filters are characterized by a transmission coefficients in the form periodic function with frequency separation between neighboring extremums $Δv_n=2^{N-n}Δv$, wherein the inputs of the said N-stage structure being each of the two inputs of each optical filter of the first stage;

(b) tuning the optical filter of each stage of said N-stage structure so that the transmission for each of $2^N$ channels from one of $2^N$ said individual inputs at the output would reach a maximal value; and (c) transmitting $2^N$ channels through said N-stage structure and receiving the multi-channel optical signal at the output of the optical filter of the last stage of the N-stage structure.

The indicated aim has also been achieved by creation of a controllable optical multiplexer used in FOCS with wavelength-division multiplexing of $2^N$ channels, whose optical frequencies capable to be tuned within a constant spectral interval Δv between neighboring channels, including $2^N$ individual input ports and one output port, said multiplexer comprising:

an N-stage structure of a tree type containing in each n-stage $2^{N-n}$ of optical filters capable of controllable tuning the transmission coefficients, where n=1, 2, ..., N, characterized in the n-stage by a transmission coefficients in the form of a periodic function with frequency separation between neighboring extremums $Δv_n=2^{N-n}Δv$ and having two inputs, and at least one output; and a controller to control the tuning of the transmission coefficients of said optical filters.

According to the invention, it is preferable that in the aforesaid multi-stage structure:

two inputs of each optical filter of the first stage are connected to one of the individual input ports;

the optical filters in each stage, other than first one, are connected by each of the two inputs to the output of one of the optical filters of the previous stage;

the output of the optical filter of the last stage is connected to the output port.

Further, according to the invention, it is preferable to use single-stage and/or two-stage and/or multi-stage asymmetric MZIs as optical filters of the multi-stage structure, and the optical filters should contain electro-optical or thermo-optical phase shift devices to control the tuning of the transmission coefficients of the aforesaid optical filters.

In addition, according to the invention, it is expedient, that the multiplexer is designed as an integrated-optical structure based on one chip.

Under these circumstances, according to the invention it is preferable that all the input ports and the output port of the multiplexer are designed based on optical waveguides.

Thus, according to the invention the controllable optic multiplexer is essentially based on the multi-stage tree structure with optical filters, each of them combine the odd and even channels and has elements for controllable tuning of the spectral characteristics.

Generally, according to the invention, one multiplexer can use optical filters of several types simultaneously: the single-stage, two-stage and multi-stage MZIs. In the first stages of the multistage structure, where the channels with a large spectral separation are passed on the input, the two-stage as well as the single-stage MZIs are used, so as the spectral separation between the channels increases, the multi-stage MZIs are used at the following stages.

The electro-optical or thermo-optical phase shift devices are applied for controllable tuning of the spectral characteristics of the optical filters. The phase shift devices, being controlled externally, provide the turning of spectral characteristics of the optical filters, and as a result the necessary turning of the spectral characteristics of the whole controllable optical multiplexer. The use of the electro-optical phase shift device ensures the maximum speed of controllable turning of the spectral characteristics of the controllable optical multiplexer.

BRIEF DESCRIPTION OF THE DRAWINGS

Hereinafter the invention is exemplarily illustrated in the following drawings.

DESCRIPTION OF PREFERRED
EMBODIMENTS OF THE INVENTION

While the invention may be susceptible to embodiment in different forms, there are described in detail herein below, specific embodiments of the present invention, with the understanding that the present disclosure is to be considered an exemplification of the principles of the invention, and is not intended to limit the invention to that as illustrated and described herein.

According to the invention, a basic element of the controllable optical multiplexer is the unbalanced or asymmetric Mach-Zehnder interferometer, as previously mentioned, a single-stage MZI. This is well known and commonly used in optics device (M. Born, E. Wolf. "The Optic Base", Pergamon Press, Oxford, Fifth Oxford, Fifth Edition, 1975, pp. 312-316; in Russian: M. Born and E. Volf. "Osnovy Optiki". Translation edited by G. Motulevich, Nauka, Moscow, 1970, pp. 342-346).

The single-stage MZI can be designed using various components and techniques, including those based on fiber-optic splitters, beam splitters, prism mirrors, and polarizers. The most optimal base component for use in the multi-stage structure is a single-stage planar MZI.

Figure 1A:
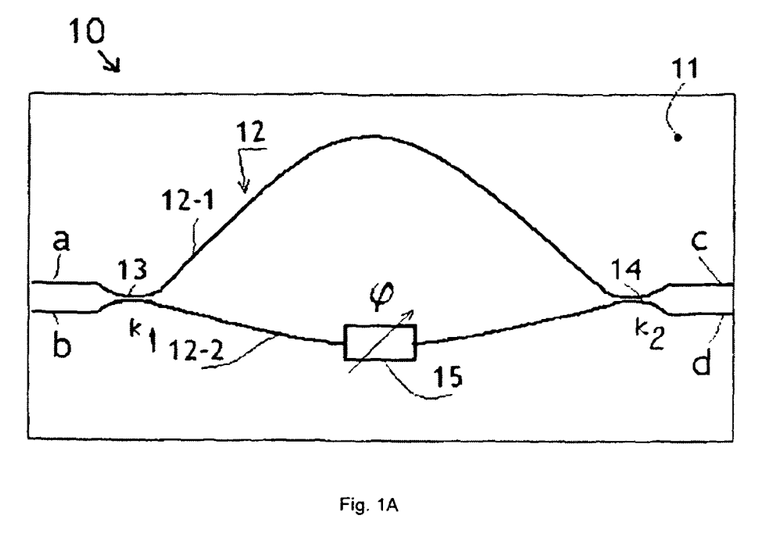
FIG. 1A—shows a schematic diagram of a known waveguide unbalanced single-stage MZI.
Figure 1B:
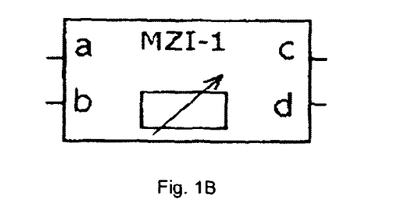
FIG. 1B—conventionally represents the known single-stage MZI shown in FIG. 1A.

FIG. 1A shows a schematic diagram of a waveguide embodiment of the single-stage MZI. Its conventional representation is shown in FIG. 1B.

A device 10 is placed on one substrate 11 where the MZI 12 is formed by two 'shoulders' 12-1 and 12-2 located between a first 13 and a second 14 splitters. These shoulders are formed by wave guides of unequal length L1 and L2, respectively. The coupling coefficients k1 and k2 of the splitters 13 and 14 are equal and divide the optical power in the ratio of 50:50. The single-stage MZI 12 is equipped with ports 'a' and 'b' on one side and ports 'c' and 'd' on other side.

In this case, the single-stage MZI, in the shoulder 12-2 contains a phase shift device 15, which is made as a controllable element used for turning of spectral characteristics and can bring an additional phase shift $\phi$ in the phase of a running wave.

The magnitude of phase shift $\phi$ is adjusted through deployment of the thermo-optical effect or the electro-optical effect by means of electric current or voltage. Consequently, the phase shift device 15 can be implemented using thermo-optical material, e.g. silicone, or electro-optical material, e.g. lithium niobate ($LiNbO_3$) or gallium arsenide. Such phase shift devices are known in the wavelength-division multiplexing technology as a tooling for tuning spectral characteristics of the optical filters on the basis of MZIs, and are used in other devices—modulators and switches as well.

When a unit of radiation power is entered through the port 'a', the intensity of light in the two output ports 'c' and 'd' can be represented using transmission coefficients $K_{ac}(v,\phi)$ and $K_{ad}(v,\phi)$:

$$K_{ac}(v, \varphi) = 0,5 \cdot \left[1 + \cos\left(\frac{2\pi n \Delta L v}{c} + \varphi\right)\right], \quad (1)$$

$$K_{ad}(v, \varphi) = 0,5 \cdot \left[1 + \cos\left(\frac{2\pi n \Delta L v}{c} + \varphi + \pi\right)\right], \quad (2)$$

wherein $D=2\pi \cdot n\Delta Lv/c$ is a phase delay caused by the different optical length of shoulders 22-1 and 22-1; $\Delta L=L1-L2$; 'n' is an index of refraction of the material; 'v' is an optical frequency; and c is the velocity of light in free space.

When excitation (entering a unit of radiation power) is provided through the port 'b', the intensity of light in the same ports 'c' and 'd' can be represented by transmission coefficients $K_{bc}(v,\phi)$ and $K_{bd}(v,\phi)$:

$$K_{bc}(v, \varphi) = 0,5 \cdot \left[1 + \cos\left(\frac{2\pi n \Delta L v}{c} + \varphi + \pi\right)\right], \quad (3)$$

$$K_{bd}(v, \varphi) = 0,5 \cdot \left[1 + \cos\left(\frac{2\pi n \Delta L v}{c} + \varphi\right)\right], \quad (4)$$

The transmission coefficients (1)÷(4) under consideration at any interval of frequencies v (or wavelengths $\lambda$), become spectral characteristics of the single-stage MZI. As can be seen, the spectral characteristics (1)÷(4) are periodic functions of light frequency v and wavelength $\lambda$, the difference of arms' lengths $\Delta L$, the index of refraction 'n', and the phase shift $\phi$.

The following properties are significant for operability of a single-stage MZI:

separation between the adjacent (neighboring) extremums in the spectral characteristics (1)÷(4) in terms of optical frequency $\Delta v$ and in terms of wavelengths $\Delta \lambda$ are equal:

$$\Delta v = \frac{c}{2\Delta Ln} \quad (5)$$

and $$\Delta \lambda = \frac{\lambda^2}{2\Delta Ln}$$

transmission coefficients (1)÷(4) corresponding to the transition of optical radiation from one input port, 'a' or 'b', to two output ports, 'c' or 'd', are $\pi$ out of phase;

transmission coefficients do not change in case of replacement of two indexes, i.e. $K_{ad}(v,\phi)=K_{bc}(v,\phi)$ and $K_{ac}(v,\phi)=K_{bd}(v,\phi)$;

by changing the magnitude of phase shift, it is possible to change the spectral characteristics (1)÷(4), shifting them along the axis of frequencies (wavelengths); in particular, the change of the phase shift by $\delta\phi=\pm\pi$ results in inversion of the signal at the outputs;

the transmission coefficients do not change in case of replacement of the indexes in the reverse order, i.e. the single-stage MZI is bidirectional.

In turn, these properties create a condition that when an optical signal, consisting of a few channels whose wavelength frequencies (wavelengths) coincide with the positions of extremums in the dependencies of transmission coefficients upon frequency (wavelengths), is passed to the input of a single-stage MZI, the resultant signals are divided into two groups which are passed to different outputs. One group consists of odd channels, whereas the other group consists of even channels, the spectral interval between the channels increases two times comparatively to the interval between the channels at the input of single-stage MZI for both the groups. As the same optical signal enters the other input, the even and odd channels swap at the outputs.

Inasmuch as the single-stage MZI is reversible, then under different conditions, when the odd channels are passed to one input and the even channels are passed to the other input, both the groups of channels are combined in one optical stream signal with denser allocation of the channels.

The devices dividing the channels into odd and even ones and conversely, combining the odd and even channels in one stream signal are identified as 'inter-leavers' in the foreign literature; the domestic literature has no term for devices with a similar purpose, so in the present disclosure they are called 'optical filters'.

The distance between the adjacent extremums $\Delta v$ (or $\Delta \lambda$), in the spectral characteristics for an actual single-stage MZI should be formed at the stage of its manufacturing by selection of the difference for the lengths of shoulders $\Delta L$ and the index of refraction 'n'. The controllable turning of the positions of transmission coefficients' extreme values relative to the predetermined frequencies v (or wavelengths $\lambda$,) should be provided by means of a corresponding adjustment of the phase shift $\phi$ when employing the optical filter within any specific device.

Figure 2:
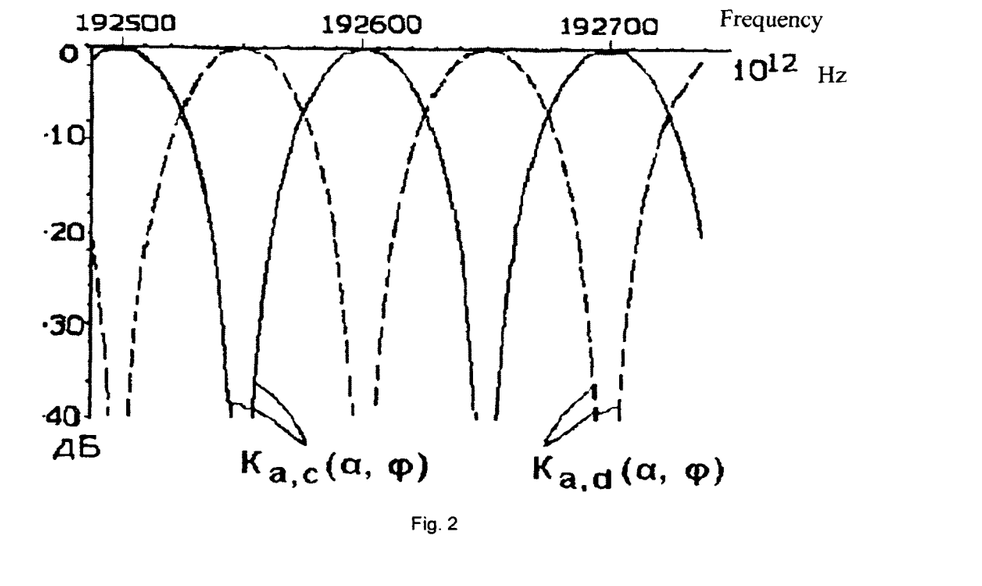
FIG. 2—illustrates the dependencies of transmission coefficients upon optical frequency for a single-stage MZI shown in FIG. 1A, FIG. 3A—shows a schematic diagram of a known two-stage waveguide unbalanced MZI.

FIG. 2 shows the transmission coefficients $K_{ac}(v,\phi)$ and $K_{ad}(v,\phi)$ versus optical frequency for a certain single-stage MZI, which under appropriate values of the phase delay D and the phase shift $\phi$ has a separation between the adjacent extremums of 50 GHz, and so can be used to combine even and odd channels into one common stream signal having a 50 GHz interval between the adjacent frequency channels. The spectrum dependence of the transmission coefficient $K_{ac}(v, \phi)$ is represented by a solid line. In accordance with this dependence, one group of channels—the odd channels—is passed to the output 'c'. In the same area the spectrum dependence of the transmission coefficient $K_{ad}(v,\phi)$, which is responsible for the output of the other channel group—the even channels—to the output 'd', is represented by a dotted line.

As can be seen in FIG. 2, this optical filter has a disadvantage in that the lines of spectral bands have non-plane peaks and slowly decreasing edges, that in the case of small spectral interval between the channels can cause cross-wise interferences ('crosstalk') between the adjacent channels. Another known disadvantage of the filter is that the induced dispersion can substantially increase, when the shoulders difference ΔL is significant (U.S. Pat. No. 6,782,158). These disadvantages limit the use of single-stage MZIs within the devices employed in communication systems with wavelength-division multiplexing.

As mentioned in U.S. Pat. No. 6,782,158, a substantial improvement of the spectral characteristics of optical filters for wavelength-division multiplexing devices and systems can be provided by two-stage MZIs, which can be designed utilizing fiber-optic splitters, beam splitters, prism mirrors, polarizers, and other known means, as well as in the integrated optical form including phase shift devices.

Figure 3A:
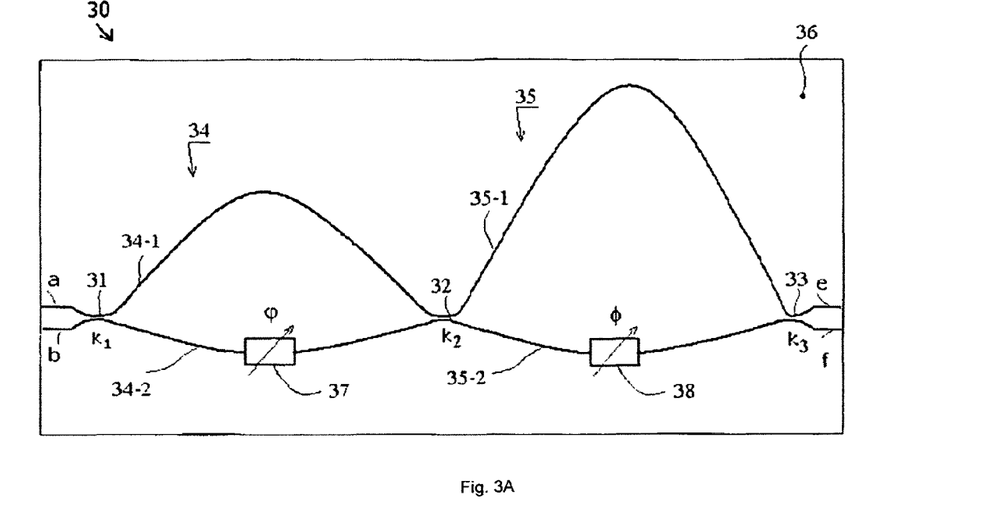
Figure 3B:
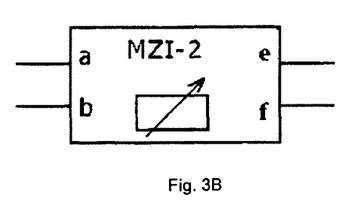
FIG. 3B—conventionally represents the known two-stage MZI shown in FIG. 3A.

FIG. 3A shows a schematic diagram of a waveguide embodiment of a two-stage MZI 30. Its conventional representation is shown in FIG. 3B. It includes three splitters 31, 32, and 33 with coupling coefficients k1, k2, and k3, which form two single-stage MZIs 34 and 35. The device 30 is placed on a common substrate 36.

In this case, the first single-stage MZI 34 is formed by two wave guides 34-1 and 34-2 of unequal lengths $L_{34-1}$ and $L_{34-2}$. The second single-stage MZI 35 is formed by two wave guides 35-1 и35-2 of unequal lengths $L_{35-1}$ and $L_{35-2}$. The phase delays $D_1=2\pi n(L_{34-1}-L_{34-2})/\lambda$, and $D_2=2\pi n(L_{35-1}-L_{35-2})/\lambda$ are related to each other by a ratio: $D_2=2D_1$.

The phase shift devices 37 and 38 providing phase shifts φ and Φ respectively, are used in the MZIs 34 and 35. The two-stage MZI is equipped with the ports 'a' and 'b' on one side and 'e' and 'c' on the other side.

There is no difficulty to analytically obtain spectral characteristics of the two-stage MZI 30. Matrices T ($k_i$) (i=1, 2, 3) should be provided for the three splitters 31-1, 31-2, and 31-3. These matrices relate the light amplitudes at the input and output using parameters of the splitters:

$$T(k_i) = \begin{bmatrix} \cos(k_i) & -i\sin(k_i) \\ -i\sin(k_i) & \cos(k_i) \end{bmatrix}, \quad (6)$$

Matrices T ($D_1$) and T ($D_2$) should be provided for the two single-stage MZIs 33 and 34:

$$T(D_1) = \begin{bmatrix} e^{i(D_1+\varphi)} & 0 \\ 0 & 1 \end{bmatrix} \quad (7)$$

$$T(D_2) = \begin{bmatrix} e^{i(D_2+\phi)} & 0 \\ 0 & 1 \end{bmatrix},$$

Then a broadband matrix M (v,φ,Φ) of the two-stage MZI is determined by the product of the five matrices:

$$M(v,\varphi,\phi) = \begin{bmatrix} M_{ac} & M_{ad} \\ M_{bc} & M_{bd} \end{bmatrix} \quad (8)$$

$$= T(k_3)T(D_2)T(k_2)T(D_1)T(k_1).$$

As the transmission coefficients of the two-stage MZI relate the optical intensity at the output with the optical intensity at the input, the following expressions should be used for the determination of the transmission coefficients:

$$K_{af}(v,\phi,\Phi)=|M_{af}(v,\phi,\Phi)|^2 \quad (9)$$

All basic properties of the two-stage MZIs can be obtained from expressions (6)÷(9). It is verifiable that the two-stage MZI is still capable to divide and combine the odd and even channels when radiation enters through the ports 'a' and 'b'. Thus, when an optical signal enters port 'a' of a certain two-stage MZI, the channels will be divided into two groups consisting of odd channels (one group) and even channels (the other group). It is worth to note an important property inherited by the two-stage MZI: when the same optical signal enters the other input port 'b', (shown on FIG. 3A), the groups with the odd and even channels swap at the output ports 'e' and 'f'.

The distances between the adjacent extremums Δv and Δλ in spectral characteristics are also determined by expressions (5), wherein ΔL is a difference of the shoulders' length in the first stage of the two-stage MZI 40, i.e. $\Delta L=L_{44-1}-L_{44-2}$. The opportunity of controllable shift of the spectral characteristics, at this time by means of two phase shifts φ and Φ, is still kept. In order to shift the spectral characteristics $K_{ae}(v,\phi,\Phi)$ and $K_{af}(v,\phi,\Phi)$ along the frequency axis by a magnitude of δv, it is necessary to change the phases φ and Φ by means of corresponding phase shift devices:

$$\delta\varphi = -\frac{\pi \cdot \delta v}{\Delta v} \quad (10)$$

$$\delta\phi = -\frac{2\pi \cdot \delta v}{\Delta v}.$$

Analyzing expression (6)÷(9), one can infer that when a signal enters through the ports 'e' and 'f' the filter loses the capability to divide the signal into odd and even channels and to reversely combine the odd and even channels. This is caused by the fact that, according to expressions (6) and (7), the matrices are non-switchable. Because of this, the two-stage MZIs are not reversible: the two ports 'a' and 'b' on the one side can be used only as input ports, whereas the two others 'e' and 'f' from the opposite side can be used only as output ports.

Figure 4:
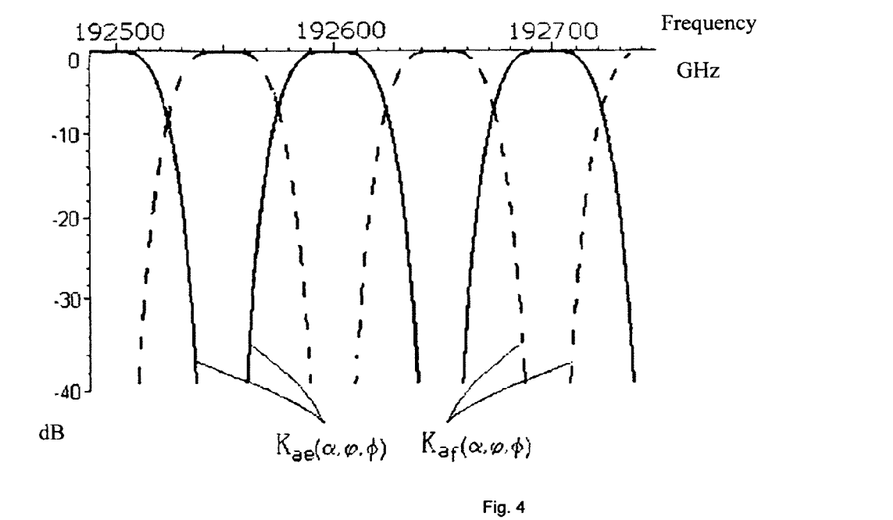
FIG. 4—illustrates the dependencies of transmission coefficients upon optical frequency for a two-stage MZI shown in FIG. 3A.

FIG. 4 shows the transmission coefficients $K_{ae}(v,\phi,\Phi)$ and $K_{af}(v,\phi,\Phi)$ for certain two-stage MZI as functions of optical frequency calculated using expressions (6)÷(9). This two-stage MZI with the coupling coefficients k1=0.7854, $k_2$=2.0944, $k_3$=0.3218, corresponding phase delays $D_1$ and $D_2$ and phases φ and Φ can be used as optical filter of 50 GHz to combine even and odd channels into a common stream of the channels with an interval of 50 GHz between the adjacent channels. The spectrum dependence of transmission coefficient $K_{ae}(v,\phi,\Phi)$ is shown by solid lines. In accordance with this dependence, when entering through the port 'a', one group of channels (odd channels) is passed to the output 'e'. In the same area the spectrum dependence of transmission coefficient $K_{af}(v,\phi,\Phi)$, which is responsible for output of the other channel group (even channels) to the output 'f', is shown by dashed lines.

It can be seen that the two-stage MZI has a significantly better shape of the spectral characteristics, which is close to rectangular, with a flat top and a steep slope on the edges of spectral bands. Consequently, the two-stage MZI used as an optical filter provides a better suppression of cross-wise interferences ('crosstalk') and higher isolation of the channels. However, the induced dispersion of the two-stage MZI is still substantial, which is why it is limited in use as a filter in high-speed communication systems.

It is known that the situation can be improved by using the filters obtained as a result of cascading of two-stage MZIs. One version of similar devices can be based on complementary two-stage MZIs with identical broadband coefficients, but with the opposite dispersion sign. The complementarity of the two-stage MZIs is provided by a certain ratio of coupling coefficients $k_1$, $k_2$, and $k_3$ in the used two-stage MZIs (U.S. Pat. No. 6,782,158).

Figure 5A:
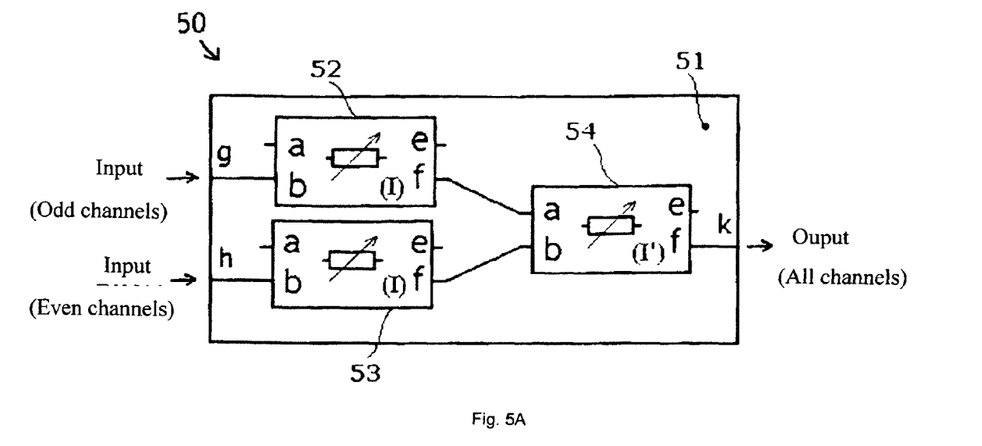
FIG. 5A—shows a schematic diagram of a known multi-stage including MZI with a zero or near-zero dispersion that includes three two-stage MZIs.
Figure 5B:
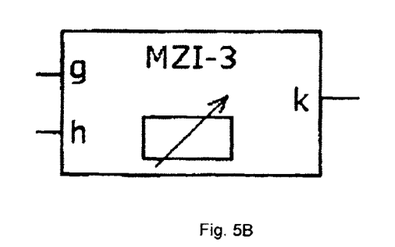
FIG. 5B—conventionally represents the known multi-stage MZI shown in FIG. 5A.

FIG. 5A presents an embodiment of a multi-stage MZI 50, which can be used to combine the odd and even channels. The conventional representation of the multi-stage MZI is shown in FIG. 5B. The waveguide device 50 is placed on one substrate (crystal) 51 and includes three two-stage MZIs: two two-stage MZIs 52 and 53, both of the type I, are used in the first cascade, whereas a two-stage MZI 54 of the type I', (i.e. with the opposite dispersion sign) is used in the second cascade.

When inputting the odd and even channels respectively through external ports 'g' and 'h', the MZIs 52 and 53 just pass only one group: one of them passes the odd channels, and the other one passes the even channels to its output ports 'f'. The channels are combined by means of a MZI 54, as a result they are passed to the external port 'k'. Inasmuch as the dispersion of the two-stage MZIs 52 and 53 and, on the other hand, the dispersion of the two-stage MZI 54 are opposite, then a zero or near-zero dispersion of the whole device 50 is provided.

Figure 6:
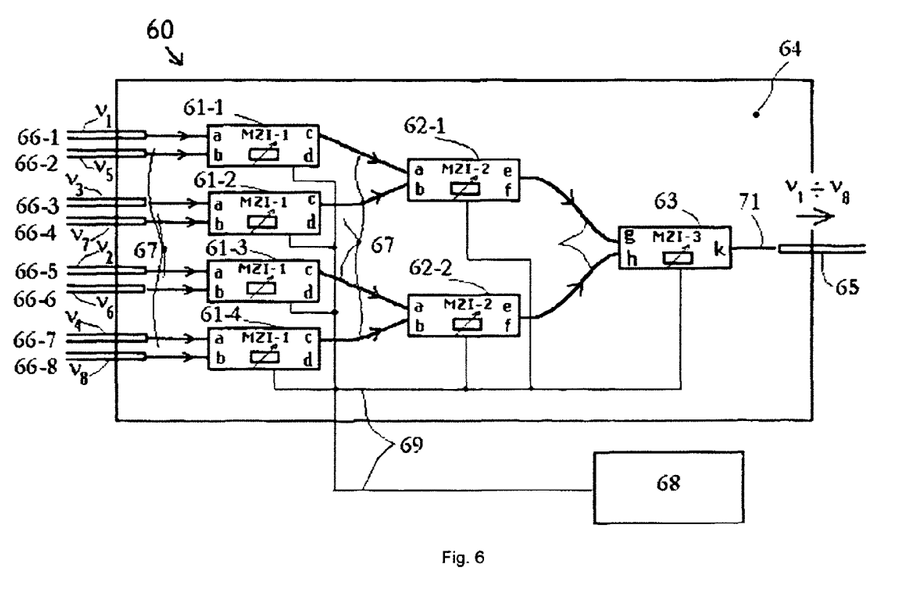
FIG. 6—depicts a circuit diagram of an embodiment of the controllable optical multiplexer according to the present invention.

The diagram of another embodiment of a controllable optical multiplexer, according to the present invention is shown in FIG. 6. It is a controllable optical multiplexer 60 of a configuration "1×8", i.e. a device for combining 8 channels with a spectral interval between the adjacent channels of $\Delta v=1,600$ GHz.

The multiplexer 60 is essentially based on a three-stage tree structure having seven optical filters. Four optical filters (61-1)÷(61-4) of the first stage of the so formed multi-stage structure are connected by their output ports to two following optical filters 62-1 and 62-2 of the second stage, which in turn are connected by their output ports to an optical filter MZI 63 of the third stage. The whole device is assembled on one substrate 64.

The external optical outputs of the above-described multiplexer are made based on optical waveguides. Hereat, an optical waveguide 65 is used as a common output port, whereas optical waveguides 66-1 . . . , 66-8 are used as 8 input ports, each of them providing input of a separate channel. Connections of the optical filters of all three levels, as well as their ports, with external output optical waveguides are made by optical waveguides 67 formed on the substrate 64. The optical waveguides 65, 66-1 . . . , 66-8 are optically adjusted with the waveguides 67 with maximal efficiency.

The multiplexer 60 is controlled dynamically by turning the spectral characteristics of the aforesaid seven optical filters, each including a phase shift device, by means of applying corresponding voltage to the phase shift devices. Control is provided by means of a controller 68 which is connected with the optical filters by a bus 69.

The structure of the multiplexer 60 is characterized in that, in the course of passing of the optical signal from one stage to the subsequent stage, the spectral intervals between the channels decrease by two times. The spectral interval between the channels is maximal for the optical filters (61-1)÷(61-4) of the first stage, whereas it is minimal for the optical filter 63; and for the optical filters 62-1 and 62-2 used in the second stage it is intermediate. Thusly, the requirements for characteristics of the optical filters used in corresponding stages can vary. In this example, single-stage MZIs (depicted in FIG. 1B) can be used in first stage of the optical filters; two-stage MZIs can be used in the second stage (depicted in FIG. 3B); and multi-stage MZIs can be used in the third stage (depicted in FIG. 5B). Input and output ports of the optical filters of the second and third stages should be connected so that the optical signal passes in a direction from the first to the second stage of the two-stage MZIs 65 and 66, and of the two-stage MZIs incorporated into the multi-stage MZI 67.

The distance $\Delta F$ between the adjacent extremums in the spectral characteristics of the optical filters in the three stages of the device under consideration is as follows: for the single-stage MZIs (61-1)÷(61-4): $\Delta v_{61-1}=\Delta v_{61-1}=\Delta v_{61-3}=\Delta v_{61-4}=1,600$ GHz; for the two-stage MZIs 62-1 and 62-2: $\Delta v_{62-1}=\Delta v_{62-2}=800$ GHz, and for the multi-stage MZI 63: $\Delta v_{63}=400$ GHz.

Consequently, the difference $\Delta L$ of the shoulders' lengths, with respect to the expression (5) in the single-stage MZIs 61-1÷61-4 will be equal to $\Delta L_{61-1}=\Delta L_{61-2}=\Delta L_{61-3}=\Delta L_{61-4}=250$ micrometers; in the first stages of the two-stage MZIs 62-1 and 62-2 the difference is equal to $\Delta L_{62-1}=\Delta L_{62-2}=125$ micrometers, in the first stages of the two-stage MZIs making up the multi-stage MZI 63 the difference of the shoulders' lengths is equal to $\Delta L_{63}=62.5$ micrometers (it is assumed, that the index of refraction n=1.5).

For further consideration it is preferable to introduce the concept of a transmission coefficient of multiplexer, which is similar by implication to the above-considered transmission coefficients of MZIs, but in this case associated with the optical signal transmission from one of the input ports (66-1)÷(66-8) of the multiplexer to the common output port 65. The transmission coefficients of multiplexer, which are designated as $K_{66-1}÷K_{66-8}$, are defined as the product of transmission coefficients of the optical filters, through which the optical signal passes, before it arrives at the common output 65. For illustration purposes, the transmission coefficient from the input port 66-3 to the output port 65 is given by the following expression:

$$K_{66-3}(v)=K_{ah}^{61-2}(v,\phi_{61-2},\Phi_{61-2})K_{bc}^{62-1}(v,\phi_{62-1},\Phi_{62-1})K_{gk}^{63}(v,\phi_{63},\Phi_{63}), \quad (11)$$

wherein three multipliers in the right member are the transmission coefficients of three optical filters 61-2, 62-1, and 63, the upper indices correspond to the number of the optical filter, and the lower indices correspond to the input and output ports of the optical filter.

Obviously, the transmission coefficients of multiplexer are functions of optical frequency and phase shifts $\phi_n$ and $\Phi_n$. In case of a correct adjustment of the phase shift of multiplexer 60 for all its seven optical filters, each of the eight transmission coefficients should be maximal for the carrier frequency of one channel and minimal for the frequencies of the other channels.

At certain phase shifts $\{\phi^*_n\}$ and $\{\Phi^*_n\}$ of the phases in the first and second stages of the used MZIs, the transmission coefficient $\Delta T_{66-3}(v_3)$ from the input port 66-3 to the output port should be approximately equal to 1, and approximately equal to 0 when $v \neq v_i$.

At the phase shifts $\{\phi^*_n\}$ and $\{\Phi^*_n\}$, the other transmission coefficients of the multiplexer 60 have corresponding values for frequencies of the other channels.

Supposedly, input signals enter the input ports of the multiplexer 60 and the eight channels have a channel distribution at the input ports according to Table 1.

TABLE 1

Channel distribution at input ports:

| Input port | 66-1 | 66-2 | 66-3 | 66-4 | 66-5 | 66-6 | 66-7 | 66-8 |
|---|---|---|---|---|---|---|---|---|
| Channel carrier frequency | v1 | v5 | v3 | v7 | v2 | v6 | v4 | v8 |

If the phase shifts are equal to $\{\phi^*_n\}$ and $\{\Phi^*_n\}$, the multiplexer 60 operates in a such manner as a usual fixed frequency multiplexer. The single-stage MZIs (61-1)÷(6-1) of the first stage pair-wise combine the channels and direct them through their four output ports to the second stage—to the two-stage MZIs 62-1 and 62-2. The two-stage MZIs 62-1 and 62-2 combine the channels again and direct them to the following stage of the multi-stage structure. When optical waves have passed through MZI 63 at the third stage, all the channels are united and pass to the common output port 63.

Suppose, the signals enter the input ports of the multiplexer, having center frequencies of the channels $\{v'_i\}$, which are shifted by a magnitude of $\delta v < \Delta v$, i.e. $v' = v_i + \delta v$. For multiplexing and combining the channels with the new optical carrying frequencies, it is necessary to change the phases $\{\phi^*_n\}$ and $\{\Phi^*_n\}$ according to the expression (10). For example, to select the mode of channel multiplication, when the channels' frequencies have shifted by $\delta v = 50$ GHz, it is necessary to change the phase shifts according to Table 2.

TABLE 2

Change of phases $\phi_n$ and $\Phi_n$ in case of channel frequency shift $\delta v = 5\ 0$ GHz

| | MZIs (61-1)-(61-4) | MZIs 62-1 and 62-2 | MZI 63 |
|---|---|---|---|
| First stages | $\delta\phi_{61\text{-}4} \div \delta\phi_{64} = -\pi/32$ | $\delta\phi_{62\text{-}1} = \delta\phi_{62\text{-}2} = -\pi/16$ | $\delta\phi_{63} = -\pi/8$ |
| Second stages | — | $\delta\Phi_{62\text{-}1} = \delta\Phi_{62\text{-}1} = -\pi/8$ | $\delta\Phi_{63} = -\pi/4$ |

Other embodiments of the controllable optical multiplexer, according to the present invention, can differ from the above-described device 60 by quantity and type of used optical filters. In general, for the controllable optical multiplexer of the <<Mx1>> configuration, wherein M is a value from the following sequence: 4, 16, 32 ... $2^N$, is a number of stages in the multi-stage structure, which number is equal or more than 2, in each 'n' stage (wherein n=1, 2 ... N) $2^{N-n}$ optical filters should be used, and the total number of the optical filters therefore should be equal to $2^n-1$. For example, for multiplexing 32 channels, the necessary number stages increases up to 5, and the number of used optical filters increases up to 31.

The optical filters of each stage should be adjusted so as for the optical frequency for each of $2^N$ channels, the transmission coefficients from one of the $2^N$ inputs of the specified N-stage structure to the output would have maximal values.

The provision of the specified technical parameters, and, on the other hand, the reduction of cost for the controllable optical multiplexer intended for use in DWDM systems, it is preferable to use single-stage MZIs in the first stages of the multiplexer. In the subsequent stages, in case of an intermediate spectral interval between the channels it is preferable to use two-stage MZIs, and, at the last stages where the channels with a small interval therebetween enter the input, it is preferable to use multi-stage MZIs.

For the controllable optical multiplexer intended for CWDM systems, it is possible to use two-stage or even single-stage MZIs as optical filters. It's worth to note that due to the reversibility of the optical characteristics of single-stage MZIs, the device, assembled from such elements, as a whole will be also reversible, i.e., it can be used as a controllable multiplexer/demultiplexer.

Controllable optical multiplexers can be applied not only in communication systems with wavelength-division multiplexing, but also in other systems, e.g., in multi-channel systems of sensors, for optical filtering, analog systems of various designation.

For instance, the controllable optic multiplexer 60 described above can be used in an optical system with fixed frequencies of channels, where the input channels can swap. It is possible to provide the required functionality by means of respective alterations of the phase shifts $\{\phi_n\}$ and $\{\Phi_n\}$ as well. For example, if it is required to swap channels with carrier frequencies $v_1$ and $v_5$ at the inputs 66-1 and 66-2 and keep the distribution of the other channels at the input ports, then it is necessary to change the phase $\phi_{61\text{-}1}$ in the single-stage MZI 61-1, using its phase shift device as follows:

$$\phi^*_{61\text{-}1} \rightarrow \phi^*_{61\text{-}1} + \delta\phi_{61\text{-}1}, \text{ where } \delta\phi_{61\text{-}1} = \pm\pi.$$

The use of integrated-optical technologies in manufacturing of the controllable multiplexers is determinative, in order that the controllable optic multiplexer, according to the present invention, would possess necessary stability to external influences a sufficient number of channels, and fast speed performance. The use of unified standard elements in the multiplexer's structure, such as single-stage and/or two-stage and/or multi-stage MZIs, allows applying automated processing procedures that will provide high characteristics and relatively low manufacturing cost of the multiplexers.

The selection of types of the optical filters for employment in the multiplexers, i.e. single-stage, two-stage, or multi-stage MZIs, should be made with consideration of the specifics of a particular optical communication system. Electro-optical or thermo-optical devices can be used as the phase shift means, whereat, the electro-optical phase shift devices can ensure the maximum rate of adjusting the multiplexer spectral characteristics.

The examples discussed above explain the principle of operation, characteristics and preferable embodiments of the structure of the present invention. It is apparent to those skilled in the FOCS that modifications and alternative embodiments can be made without departing substantially from the teachings of the invention.

PRACTICAL APPLICABILITY

The structure of the controllable optical multiplexer, according to the invention, can be used in fiber-optic communication lines and communication systems with wavelength-division multiplexing, including backbone communication lines, where the DWDM technology is typically applied, and in regional, city, or local communication systems based on the CWDM technology.

The controllable optical multiplexer, produced according to the present invention, can be accomplished by means of the existing integrated-optical technology.

The invention claimed is:
1. A method for control of multiplexing channels in a fiber optic communication system with spectral compression of $2^N$ channels, whose optical frequencies capable to be tuned within a constant spectral interval $\Delta v$ between neighboring channels, said method comprises the steps of:

(a) inputting $2^N$ channels separately at $2^N$ individual inputs of an N-stage structure of a tree-type, said N-stage structure comprising in each n stage $2^{N-n}$ optical filters, wherein n=1, 2, ..., N, each said filter contains two inputs and at least one output, the filters are capable of controllable tuning transmission coefficients, and the filters are characterized by a transmission coefficients in the form periodic function with frequency separation between neighboring extremums $\Delta v_n = 2^{N-n} \Delta v$, wherein the inputs of said N-stage structure being each of the two inputs of each optical filter of the first stage;

(b) tuning the optical filter of each stage of said N-stage structure so that the transmission for each of $2^N$ channels from one of $2^N$ said individual inputs at the output reaches a maximal value; and (c) transmitting $2^N$ channels through said N-stage structure and receiving the multi-channel optical signal at the output of the optical filter of the last stage of the N-stage structure.

2. A controllable optical multiplexer used in optical networks with spectral compression of $2^N$ channels, whose optical frequencies capable to be tuned within a constant spectral interval $\Delta v$ between neighboring channels, including $2^N$ individual input ports and one output port (65), said multiplexer comprising:

an N-stage structure (60) of a tree type containing in each n-stage, where n=1, 2, ..., N, $2^{N-n}$ of optical filters capable of controllable tuning the transmission coefficients, characterized in the n-stage by a frequency interval between neighboring extremums in the functions of the transmission coefficients in relation to the frequency in the form of $\Delta v_n = 2^{N-n} \Delta v$ and having two inputs, and at least one input; and a controller (68) to control the tuning of the transmission coefficients of said optical filters.

3. The multiplexer according to claim 2 wherein said N-stage structure comprises:

two inputs of each optical filter of the first stage connected to one of said individual input ports;

the optical filters in each stage other than the first one, connected with each of the inputs to the output of one of said optical filters of the previous stage;

the output of the optical filter (63) of the last stage connected to the output port (65).

4. The multiplexer according to claim 2 wherein said optical filters of said N-stage structure being single-stage (10) and/or two-stage (30) and/or multi-stage (50) asymmetric Mach-Zehnder interferometers.

5. The multiplexer according to claim 2 wherein said optical filters include electro-optical or thermo-optical phase shift devices controlling the tuning of the transmission coefficients.

6. The multiplexer according to claim 2 wherein it is designed according to the integrated-optical technology, and performed as one chip.

7. The multiplexer according to claim 2 wherein all said individual input ports and said output port (65) are produced in the form of optical fibers.

8. The multiplexer according to claim 3 wherein said optical filters include electro-optical or thermo-optical phase shift devices controlling the tuning of the transmission coefficients.

9. The multiplexer according to claim 4 wherein said optical filters include electro-optical or thermo-optical phase shift devices controlling the tuning of the transmission coefficients.

* * * * *